INVENTOR.
BARRY K. HALLAMORE
BY
Christie, Parker & Hale
ATTORNEYS.

INVENTOR.
BARRY K. HALLAMORE
BY
Christie, Parker & Hale
ATTORNEYS.

United States Patent Office 3,285,613

Patented Nov. 15, 1966

3,285,613

RECORDING AND PLAYBACK APPARATUS

Barry K. Hallamore, Westminster, Calif., assignor, by mesne assignments, of thirty-seven and one-half percent to Audio Slide Company, Arcadia, Calif., a partnership Filed Sept. 15, 1965, Ser. No. 487,362

25 Claims. (Cl. 274—11)

This application is a continuation-in-part of my application Serial No. 446,842, entitled "Recording and Playback Apparatus," filed April 9, 1965. That application is a continuation-in-part of my application Serial No. 114,944, entitled "Recording Apparatus," which was filed on June 5, 1961, and which issued as U.S. Patent No. 3,177,768 on April 13, 1965, and which, in turn, was a continuation-in-part of my earlier application Serial No. 725,313, filed March 31, 1958, and now abandoned.

The present invention relates to the art of information recording and, more particularly, to recording and playback apparatus.

The subject matter of the above-mentioned patent and patent applications includes several recording apparatus in which the recording medium is automatically rewound after a recording or playback operation.

The subject invention builds upon those concepts and, from one aspect thereof, provides recording and playback apparatus with a drive, and with speed control means that regulate the operation of the drive as well as the speed of the recording medium during recording and playback.

A recording and playback apparatus in accordance with a preferred embodiment of the subject invention comprises a recording medium which is movable from one position to another, and first spring means connected to the recording medium to be wound when the recording medium is moved from the one position to the other and subsequently to move the recording medium back to the one position. According to the invention, this preferred apparatus further includes a drive actuable from an initial to an advanced position and connected to the movable recording medium for driving this medium from the above-mentioned one position to the other when the drive is actuated from the initial to the advanced position. Second spring means are connected to the drive to be tensioned when the drive is actuated from the initial to the advanced position and to return the drive to the initial position. Further according to the invention, this preferred apparatus includes governor means connected to the drive and the recording medium for checking the action of the first and second spring means to control the speed at which the drive is returned to the initial position and the speed at which the recording medium is moved back to the above-mentioned one position. This preferred apparatus further includes recording and playback means for recording information onto, and selectively playing information back from, the recording medium when this medium is moved back to the above-mentioned one position.

In accordance with a further preferred embodiment, the above-mentioned governor means may be combined with the drive and the drive connected to the recording medium, so that the governor means is connected to the drive and, through a portion of the drive, also to the recording means.

From another aspect thereof, the invention provides recording and playback apparatus, comprising a manually operable member and a mechanism for moving a recording medium. The manually operable member is connected to the mechanism and is movable from an initial position to an advanced position for actuating the mechanism. The manually operable member is also movable from the advanced position back to the initial position. Means are coupled to the operable member for regulating the movement of this member back to the initial position so that this movement corresponds to the movement of the recording medium during recording and playback operations. This enables the operable member to indicate the time elapsed during recording and playback operations. By being capable of indicating the time elapsed, this member is, of course, also capable of indicating the remaining recording or playback time during a recording or playback operation, if such an indication, rather than an indication as to elapsed time is desired.

By virtue of the various features disclosed herein, the subject invention provides apparatus which are particularly suitable for cooperation with and actuation of the recording structures of the apparatus disclosed in the above-mentioned patent and patent applications.

The invention and further features and objects thereof are more readily apparent from the following detailed description of preferred embodiments of the invention, illustrated by way of example in the accompanying drawings, in which.

Figure 2:
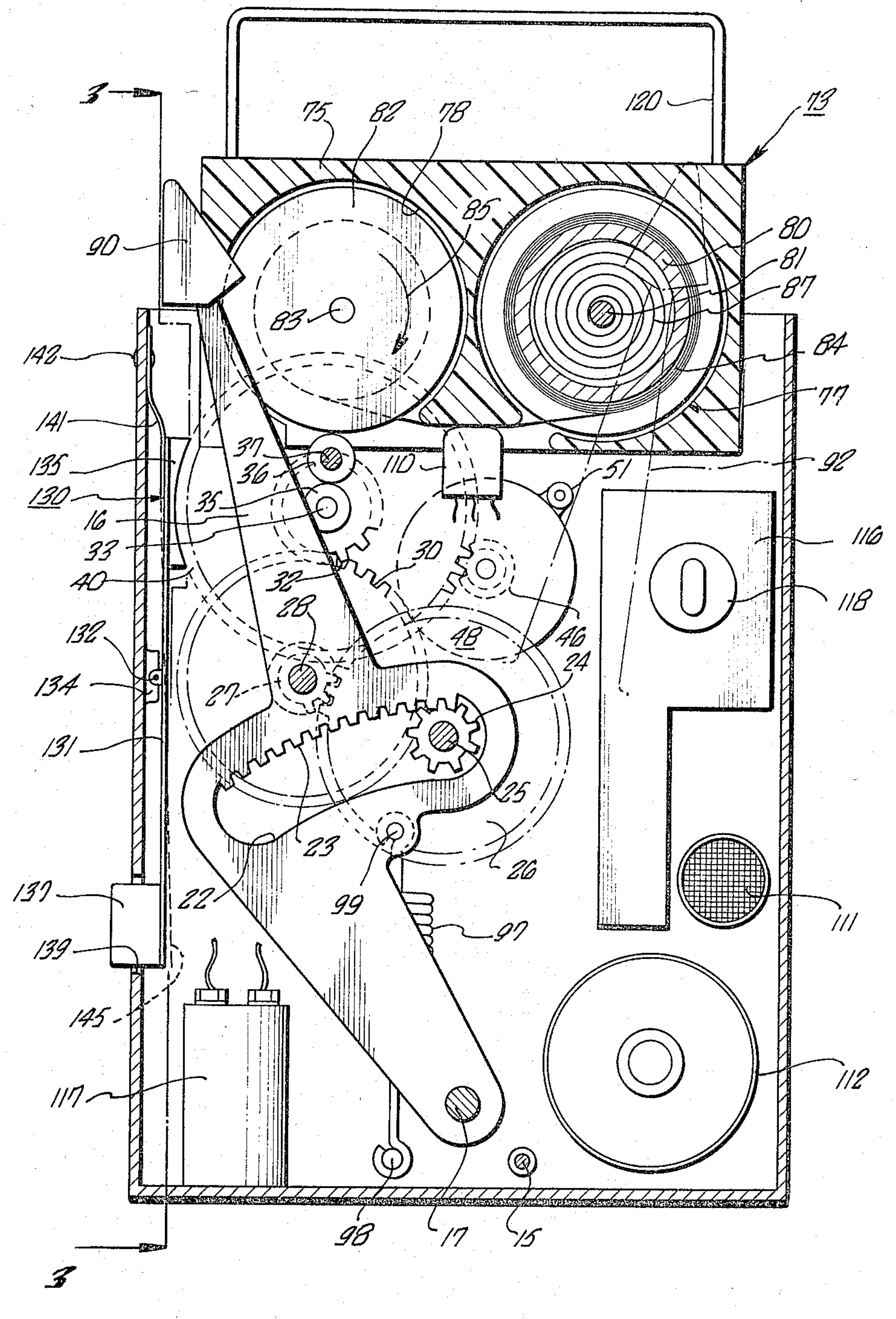
FIG. 2 is an elevation of the apparatus shown in FIG. 1 with the front cover removed and portions partially broken away.
Figure 3:
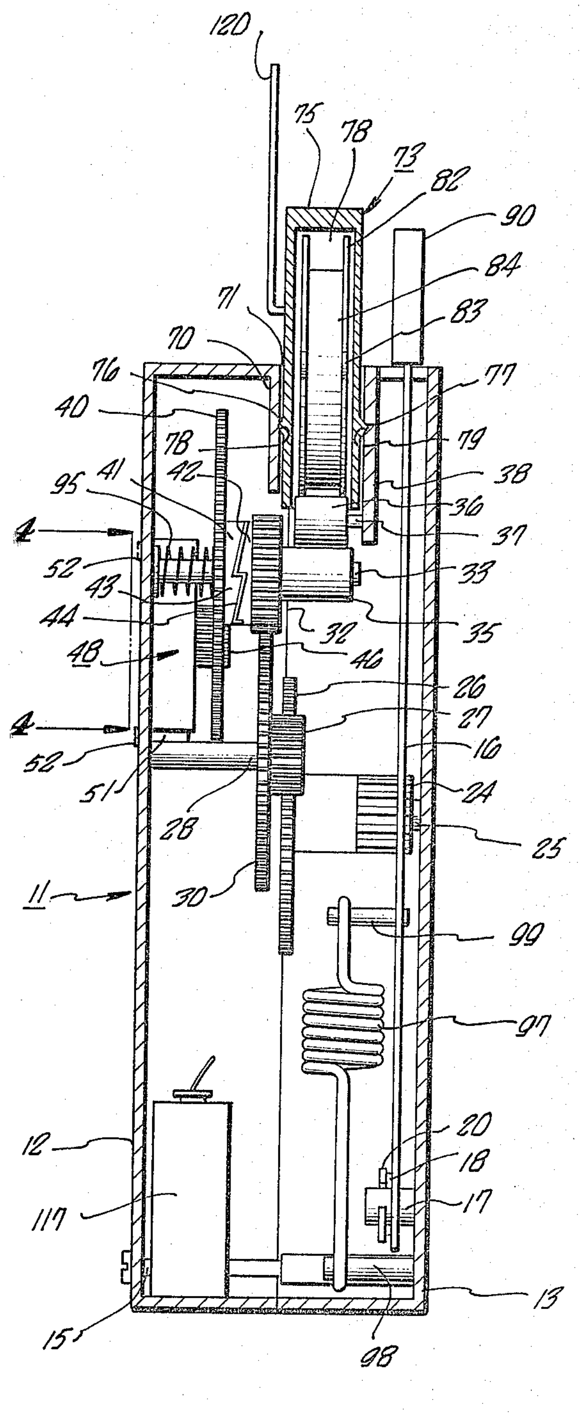
FIG. 3 is a view along line 3—3 of FIG. 2, with parts broken away.

The recording and playback apparatus 10 illustrated in the drawings has a housing 11 which, as best apparent from FIG. 3, is composed of mating halves 12 and 13 which are releasably held together by a number of screws, one of which is apparent in FIGS. 2 and 3 at 15. The apparatus further includes a lever 16 which is pivotally mounted on a post 17 that projects from the housing half 13. As apparent from FIG. 3, a washer 18 and a cotter pin 20 are employed to retain the lever 16 on the post 17.

As is apparent from FIG. 2, the lever 16 has an aperture 22 at which it defines a slightly curved rack 23. This rack is in engagement with a pinion 24 that is rotatable on a shaft 25 and that has a gear wheel 26 attached thereto. The gear wheel 26 meshes with a pinion 27 that is rotatably mounted on a shaft 28 and that has a gear wheel 30 attached thereto. The gear wheel 30 meshes with a pinion 32 which is rotatably mounted on a shaft 33. A friction roller 35 is attached to the pinion 32 to be rotatable therewith about the shaft 33. A further friction roller 36 is in operative engagement with the friction roller 35 and is rotatable about a shaft 37. The shaft 37 projects from a partition 38 which is connected to the housing half 13.

A gear wheel 40 is coupled to the pinion 32 by a clutch 41. This clutch has a part 42 connected to the pinion 32 and a part 43 connected to the gear wheel 40. The clutch parts 42 and 43 engage each other along a circular saw tooth configuration 44, so that the clutch part 42 positively engages the clutch part 43 when the pinion moves in one direction of rotation, while the clutch part 42 is able to slide or rotate relative to the clutch part 43 when the pinion 32 moves in the opposite direction of rotation. The purpose of this clutch will become apparent as this description proceeds.

The gear wheel 40 meshes with a pinion 46 of a governor 48. The structure of this governor is more readily apparent from FIG. 4, which shows that the governor has a housing or drum 50 with three ears 51 for the attachment of the drum to the housing half 12 by means of a number of screws 52.

Figure 4:
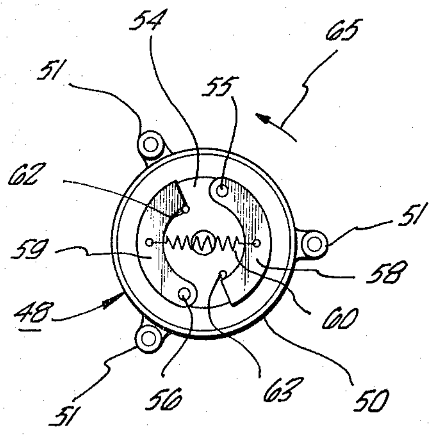
FIG. 4 is a view along line 4—4 in FIG. 3, with parts broken away, showing a speed regulating device.

The governor pinion 46 which is apparent from FIGS. 2 and 3 is connected to a disc 54 which is rotatably mounted inside the drum 50 (see FIG. 4). This disc, which is driven by the gear wheel 40 through the pinion 46, carries two upright pins 55 and 56. Two brake shoes 58 and 59 are pivotally mounted on the pins 55 and 56, respectively. A schematically illustrated spring 60 biases the brake shoes 58 and 59 toward each other against rest pins 62 and 63.

When the pinion 46 rotates the disc 54 in the direction of the arrow 65 shown in FIG. 4, the brake shoes 58 and 59, which also serve as centrifugal masses, are driven against the bias of the spring 60 toward the inner wall of the drum 50 where a braking action takes place. This kind of speed governor is well known, since it is of a type which is widely employed in a large number of standard telephone apparatus with self-dialing mechanism. The purpose of this governor in the subject apparatus will become apparent as this description proceeds.

As is apparent from FIG. 3, the housing half 12 has attached thereto a partition 70 which, together with a previously mentioned partition 38, forms an elongated slit 71 for the reception of a tape cartridge 73.

The tape cartridge 73 is of a type described in the initially mentioned patent and patent applications. In the presently illustrated embodiment, the cartridge 73 has a housing 75 which defines a pair of bosses 76 and 77 that, respectively, engage the partitions 70 and 38 at corresponding cavities 78 and 79 and form thus a pair of detents which releasably hold the cartridge 73 in engagement with the apparatus housing 11. The cartridge 73 is insertable into and selectively removable from the slit 71 in the apparatus housing.

The cartridge defines a cavity 77 and a cavity 78. A spool or reel 80 is mounted in the cavity 78 for rotation about a stationary shaft 81. A spool or reel 82 is mounted in the cavity 78 for rotation about a shaft 83. A magnetic recording tape 84 is wound on the reel 80 and is connected to the reel 82, so that the tape is unwound from the reel 80 and wound onto the reel 82 when the reel 82 is rotated in the direction of the arrow 85. A spring 87 is connected between the stationary shaft 81 and the reel 80 and biases this reel for rotation in a direction so as to rewind onto this reel magnetic tape which has been unwound therefrom.

The winding and rewinding of the magnetic tape 84 will now be described. The previously mentioned lever has a manually engageable member 90 by means of which the lever can be moved from the initial position shown in solid lines to an advanced position. An examination of the drawings will at once reveal that the expression "an advanced position" is not intended to denote only one advanced position, at least not in connection with the illustrated preferred embodiment. The lever 16 can thus be moved to the extreme advanced position indicated in FIGS. 1 and 2 by dotted lines 92 or to any other advanced position between the initial position and the most extreme advanced position. The lever 16 could thus, for instance, be moved from the illustrated initial position to the advanced position indicated in FIG. 1 by a phantom line 93.

When the lever 16 is moved to an advanced position, the curved rack 23 causes rotation of the pinion 24 which, in turn, causes rotation of the gear wheel 26, pinion 27, gear wheel 30, pinion 32, friction roller 35, and friction roller 36. The friction roller 36 engages the reel 82 of the removable cartridge 73 and rotates this reel so as to unwind recording tape from the reel 80 and wind this tape onto the reel 82. The gear assembly is preferably constructed and dimensioned such that most of the recording tape 84 is unwound from the reel 80 and wound onto the reel 82 when the lever is moved from its initial position to the extreme advanced position. The necessary step-up ratio of the gear assembly between pinion 24 and roller 36 depends on the length of the magnetic tape which is to be wound onto the reel 82 during an extreme advancement of the lever 16. Depending on this length, more gear stages than illustrated can be provided between the pinion 24 and the pinion 32. The provisions of more gear stages is conventional and is thus not illustrated herein.

When the lever 16 is moved from the initial position to an advanced position, a speed control action by the governor 48 is not desired in the illustrated apparatus, since no recording or play-back takes place in such apparatus during such advancement. To keep the way clear for a speedy advancement of the lever 16 from the initial position, the above-mentioned clutch 41 is provided. This clutch, it will be recalled, has clutch parts 42 and 43 which engage each other along a circular saw tooth configuration 44. While the rate of movement of the lever 16 during an advancement away from the initial position may be such that the action of the governor 48 is not detrimentally noticeable, the clutch 48 will permit the pinion 32 and clutch part 42 to move relative to the clutch part 43, whereby the action of the governor cannot impede the movement of the lever to an advanced position. A spring 95 bears against the gear wheel 40 and maintains the clutch parts 42 and 43 in a normally engaged position.

Those skilled in the art will, of course, recognize that one of the conventional clutch action devices employed with the governor in the mechanism of self-dialing telephone apparatus would also be suitable for the present purpose, inasmuch as the types of governors used in those mechanisms would themselves be suitable.

The lever 16 is biased to its initial position by a spring 97 which is connected between a post 98 projecting from the housing half 13 and a post 99 projecting from the lever 16. If the lever is moved to an advanced position, the spring 97 is tensioned and will move the lever back to its initial position. At the same time, the spring 87 in the cartridge assembly 73 biases the recording tape 84 for the movements of this tape from the reel 82 back to the reel 80 and the winding of the tape onto the latter reel 80.

The movement of the lever 16 from an advanced position back to the initial position and the movement of the tape from the reel 82 back onto the reel 80 are both controlled by the governor 48 which is active through the engaged clutch 41. The governor 48 thus enables the recording of information onto the tape 84 and the playback of information which has previously been recorded onto the tape. At the same time, the governor 48, by checking not only the action of the spring 87, but also the action of the spring 97, provides for a controlled return of the lever 16 toward and to its initial position.

Figure 1:
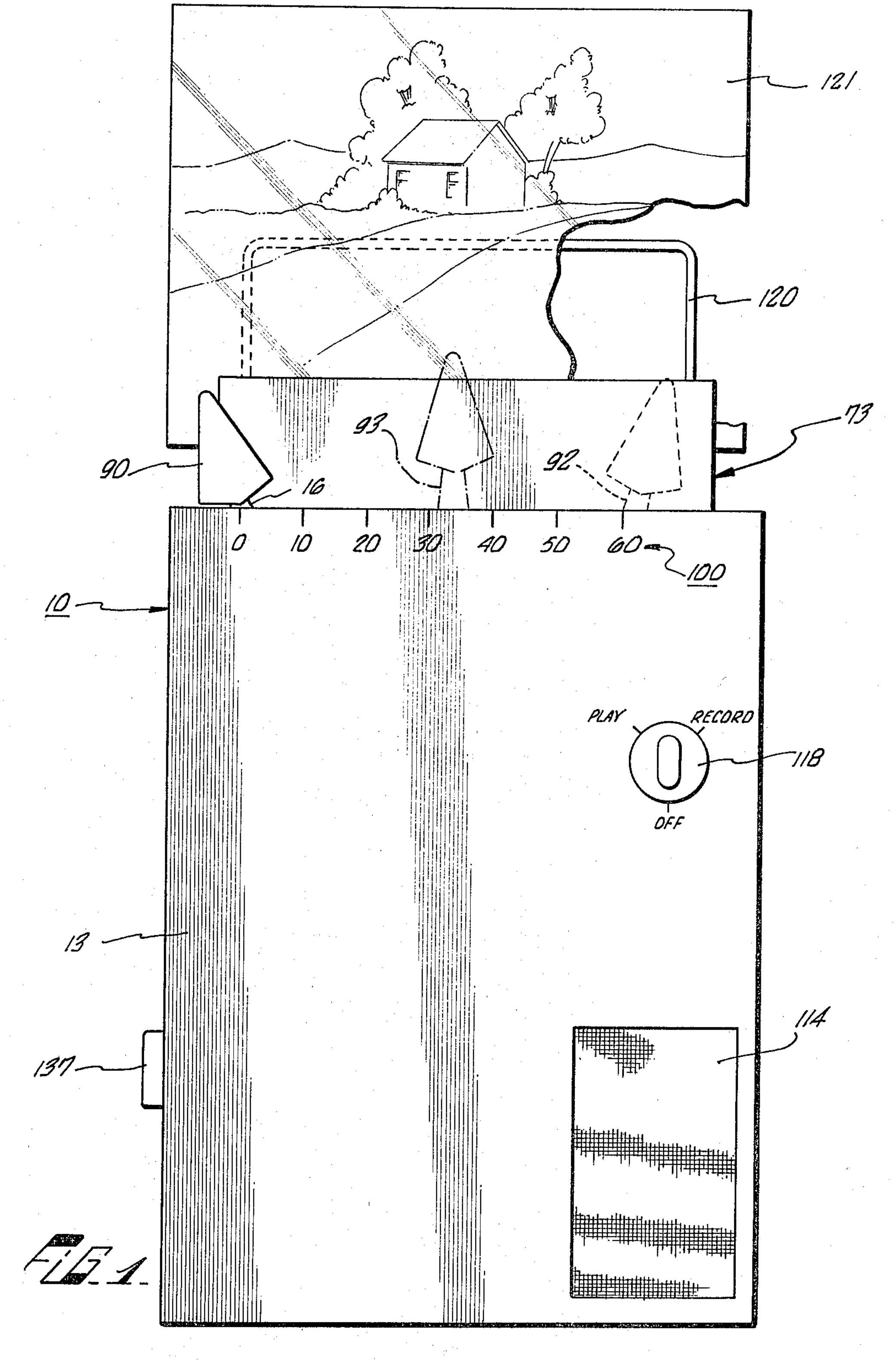
FIG. 1 is a front elevation of a recording, playback and image viewing apparatus in accordance with a preferred embodiment of the present invention.

During such return, the lever 16 remains coupled to the tape reel 82 so that the instantaneous position of the lever during its return corresponds to the position of the tape and is thus indicative of the time which has elapsed during a recording or playback operation, as well as of the time left for recording or playback. To indicate such time, the housing half 13, as illustrated in FIG. 1, carries a scale 100 which indicates the remaining recording or playback time in seconds. In connection with this scale, the supposition is made that the movement of the lever 16 from the solidly indicated initial position to the extreme advanced position shown by dotted lines 92 will cause the winding of a sufficient length of tape 84 onto the reel 82 to provide for a sixty second recording or playback operation. As the lever moves back to a less advanced position and ultimately to its initial position, spaced markings indicate the recording or playback time left in terms of seconds.

For the sake of convenience, the scale 100 in FIG. 1 has been illustrated in a linear form. It should, however, be understood that neither the movement of the tape 84 nor of the lever 16 need proceed at a constant rate, inasmuch as it is the reel 82, rather than the tape 84, which in the illustrated embodiment is engaged and directly driven by the friction roller 36. The speed of the tape 84 is thus bound to vary with the diameter of the coil of tape present on the reel 82 during a recording or playback operation. This is somewhat reminiscent of the relative speed relations of the stylus and the groove during the recording and playback of information onto and from phonograph records. As is well known, a gradually varying speed during playback is not detrimental if the speed has varied in the same sense and manner during the recording of the particular information; always assuming, of course, that the speed is never permitted to become that low that acceptable recording fidelity becomes impossible.

One significant advantage of maintaining the drive in engagement with one reel during unwinding and winding of the tape and of employing a spring of the type of spring 87 for tape rewinding, resides in the fact that this obviates the necessity of having to switch the drive from one reel to the other or of having to provide some auxiliary type of drive for one of those reels, as would, for instance, be necessary if the roller 36 were to engage and drive the tape 84 directly.

A further advantage is obtained by virtue of the fact that the drive remains engaged with the reel 82 during the rewinding of the tape 84. This advantage is due to the inherent inertia of the drive with its gear wheels and pinions, which imparts a certain increased stability on tape rewinding operations. The subject drive is thus not only used to advance the tape, but also to stabilize its movement during recording and playback operations. This stabilization advantageously combines with the action of the governor 48. While only one gear wheel has been shown in the illustrated embodiment between the pinion 32 and the governor pinion 46, it should, of course, be understood that additional or different gear means may be employed if a higher step-up ratio is desired between the pinions 32 and 46. This is in accordance with conventional practice and is thus not specifically illustrated.

As shown in FIG. 2, a recording and playback head 110, which may be of a conventional type, is mounted in housing 11 so as to engage the recording tape 84 when a cartridge 73 is inserted on the housing.

As further illustrated in FIG. 2, a microphone 111 and a loudspeaker 112 are also mounted in the housing 11 and are protected by a sound transmitting cover 114 as shown in FIG. 1. The apparatus further includes electric circuitry 116 which is powered by a battery 117 and controlled by a switch 118. The switch 118 has an OFF position in which the circuitry is deenergized, and a RECORD position (see FIG. 1) in which information is picked up by the microphone 111, and is recorded onto the tape 84 by action of the circuitry 116 and the head 110 which erases previously recorded information at the same time. The switch 118 further has a PLAY position in which information is played back from the tape 84 by action of the head 110 and circuitry 116 and reproduced by the loudspeaker 112.

Since the invention is not concerned with the recording and playback head 110 as such, nor with the microphone 111, loudspeaker 112, circuitry 116, battery 117, or switch 118, these parts have only been illustrated diagrammatically, and their electrical interconnections have not been shown. These parts may, of course, all be conventional. Their nature and operation is well known in the magnetic recording art.

It will now be recognized that the subject invention provides apparatus in which information can be stored efficiently, conveniently, and reliably. Once the switch 118 has been set for recording or playback, the recording or playback operation can virtually be controlled by manipulation of the lever 16 through the manually engageable member 90. For example, the user of the apparatus can temporarily interrupt a recording or playback apparatus by bearing with his thumb or finger against the member 90 whereby movement of the tape may be temporarily stopped. If it is desired during a recording operation to change a passage, the lever 16 may be advanced back beyond such passage and may then be released for the recording of the amended text. By the same token, the lever 16 may be moved back beyond a recorded passage if it is desired during a playback to overhear this passage once more.

FIG. 2 illustrates further means for stopping and selectively releasing the tape 84 during recording and playback operations. This stopping means 130 includes a lever 131 which is pivoted at a shaft 132 supported by a lug 134 which projects from housing 11. The lever 131 carries a stopping member or brake shoe 135 at one end thereof. A manually actuable member or button 137 projects from the other end of the lever 131 and through an aperture 139 in housing 11. A leaf spring 141 is attached to the housing 11 by a rivet 142 and biases the brake shoe 135 into contact with the gear wheel 40 so that the motion of this gear wheel is arrested. By virtue of the clutch 41, which is shown in FIG. 3 and has been described above in detail, it is still possible to move the lever 16 from an initial position to an advanced position even though the shoe 135 is in engagement with the wheel 40. However, movement of the drive mechanism and the tape for recording or playback operations is only possible when the button 137 is manually depressed so that the lever is moved as indicated in FIG. 2 by the dotted line 145, and the shoe 135 is thus temporarily lifted from the wheel 40. As long as the button 137 is maintained depressed, the wheel 40, as well as the other gear wheels and the pinions can turn and information recording or playback is possible. The user of the apparatus releases the button 137 if he wishes to stop a recording or a playback operation. In this manner, a user can, for example, collect his thoughts during a recording operation or take notes during a playback operation whenever he desires, or can take or listen to messages at different times.

While not necessarily so limited, the apparatus of the subject invention is particularly suitable for the recording of shorter pieces of information at a time, with a sufficient suppy of replaceable cartridges 73 being provided if the recording of longer messages is desired. As illustrated in FIGS. 1, 2 and 3, the tape cartridge 73 may optionally be provided with a clip arrangement 120 which permits the mounting of a picture 121 to the cartridge 73. Information concerning matter shown on the picture 121 may be recorded on the tape in the particular cartridge 73 and may be played back when the picture is viewed at a later time. In this manner, pictures can be taken, such as with an instantly developing camera, and can be accompanied by authentic or explanatory audible information. A very significant volume of information can thus be recorded and communicated at relatively little effort, since the information content of the picture permits the information content of the sound recording to be limited to essentials. The two information contents thus complement each other in a most advantageous manner. If desired, the recording cartridge may also be provided with means for mounting a transparent picture.

A somewhat altered mode of operation is possible if the lever 16 is moved to the advanced position while the tape cartridge 73 is removed from the housing 11. The cartridge 73 is then placed onto the housing so that the reel 82 is engaged and driven by the roller 36 to wind tape from the reel 80 onto the reel 82 and permit recording and playback operations, while the tape is thus wound. Rewinding of the tape is effected by the spring 87 when the cartridge is removed from the housing 11.

In this mode of operation, the drive actuated by the lever 16 and controlled in its operation by the governor 48 advances the tape by turning the reel 82 in a direction opposite to the arrow 85 for recording and playback during such advance in a sense so that the spring 87 is tensioned during recording and playback and rewinds the tape automatically after a recording or playback operation when the tap cartridge is removed from the apparatus housing 11.

Various other applications and modifications of the apparatus and means shown herein within the scope of the invention will be apparent to those skilled in the art.

I claim:

1. Recording and playback apparatus, comprising a recording medium movable from one position to another, first spring means connected to the recording medium to be wound when the recording medium is moved from the one position to the other and to move the recording medium subsequently back to the one position, a drive actuable from an initial to an advanced position and connected to the movable recording medium for driving the recording medium from the one position to the other when the drive is actuated from the initial to the advanced position, second spring means connected to the drive to be tensioned when the drive is actuated from the initial to the advanced position and to return the drive to the initial position, governor means connected to the drive and the recording medium for checking the action of the first and second spring means to control the speed at which the drive is returned to the initial position and the speed at which the recording medium is moved back to said one position, and recording and playback means for recording information onto, and selectively playing information back from, said recording medium when the recording medium is moved back to said one position.

2. Apparatus as claimed in claim 1, wherein the governor is combined with the drive and the drive is connected to the recording medium so that the governor means is connected to the drive and, through a portion of the drive, also to the recording medium.

3. Apparatus as claimed in claim 2, including clutch means connected to the governor means and constructed to permit the drive to be actuated quickly from the initial to the advanced position while the regulating action of the governor means is suspended.

4. Apparatus as claimed in claim 1, wherein the drive includes a manually actuable lever.

5. Apparatus as claimed in claim 4, wherein the drive includes gear means having a pinion, and the lever has a rack engaging the pinion for moving the drive from the initial to the advanced position upon actuation of the lever.

6. Apparatus as claimed in claim 5, wherein the governor means is operatively connected to the gear means of the drive.

7. Apparatus as claimed in claim 6, wherein the gear means is connected to a reel for moving the recording medium from said one position to the other.

8. Apparatus as claimed in claim 4, including means defining a graduated scale cooperating with said lever for indicating recording or playback time as said second spring means is returning the drive to the initial position.

9. Apparatus as claimed in claim 1, wherein said drive, second spring means, governor means, and at least part of said recording and playback means are mounted on a structure, and said recording medium and first spring means are included in a cartridge selectively placeable onto and removable from said structure as a unit.

10. Sound reproducing apparatus, comprising a pair of independently rotatable spools, means for mounting said spools, an information-bearing recording tape connected to each of the spools so that the recording tape is wound on one of the spools and unwound from the other spool when said one spool is rotated in one direction, a manually operable member, means for mounting the member for actuation from an initial position to an advanced position, motion transmitting means coupled to said one spool for conveying to said spool the motion of said member during actuation from said initial to the advanced position to rotate said one spool in said one direction and wind a length of said tape onto said one spool, a first spring coupled to said member to be tensioned during actuation of the member to said advanced position, the first spring, when tensioned, returning said member from the advanced to the initial position, a second spring coupled to said other spool to be tensioned when said length of recording tape is wound onto said one spool and to rewind said length of tape from said one spool onto the other spool when said first spring is returning said member to the initial position, a governor coupled to said member and said one spool for controlling the speed at which the member is returned to the initial position and the speed at which the length of tape is rewound onto said other spool, and means for audibly reproducing the information on the recording tape during rewinding onto said other spool.

11. Apparatus as claimed in claim 10, wherein said motion transmitting means includes gear means coupled between said member and said one spool, said governor being coupled to said gear means to be coupled to said member as well as to said one spool.

12. Apparatus as claimed in claim 11, wherein said gear means is coupled to said member by a rack and pinion arrangement.

13. Apparatus as claimed in claim 10, including means for erasing information from said tape and recording information onto the tape.

14. Apparatus as claimed in claim 10, wherein the spools, tape and second spring means are mounted in a cartridge forming an individually removable unit.

15. In a recording and playback apparatus, a manually operable lever means mounted to be movable from an initial to an advanced position and coupled to a recording medium to move the recording medium to a first position during movement of the lever means from the initial to the advanced position, a first spring means coupled to the lever means to return the lever means from the advanced to the initial position, a second spring means coupled to the recording medium to drive the recording medium to a second position during said return of the lever means to the initial position, and a governor means coupled to the recording medium and the lever means, whereby the movements of the recording medium to the second position and the return of the lever means to the initial position are speed-controlled and synchronized.

16. In a recording and playback apparatus as claimed in claim 15, a graduated scale positioned adjacent the path of lever means movement from the advanced to the initial position, and cooperating with the lever means to indicate recording and playback times.

17. Sound reproducing apparatus, comprising a support carrying a drive mechanism actuable from an initial position to an advanced position, first spring means connected to the drive mechanism to be tensioned upon actuation of the mechanism from said initial to said advanced position, and to move the mechanism thereafter from the advanced position back to the initial position, a governor connected to the drive mechanism to control the operation of the drive mechanism during movement from said advanced back to said initial position, a recording medium movable from one position to another, means for removably mounting said recording medium on said support and connecting said recording medium to said drive mechanism for movement of the recording medium from said one position to said other when said mechanism moves from said advanced to said initial position, second spring means coupled to said recording medium to be tensioned when said recording medium is moved from said one position to said other, and to move said recording medium thereafter from said other position back to said one position, and means for reproducing information from the recording medium.

18. Apparatus as claimed in claim 17, including means for recording information onto the recording medium.

19. Apparatus as claimed in claim 17, wherein the recording medium is a magnetic recording tape.

20. Apparatus as claimed in claim 19, wherein the recording tape is wound in a coil which is unwound when the recording medium is moved from said one to said other position and rewound by said second spring means when the recording medium is moved from said other back to said one position.

21. Apparatus as claimed in claim 19, wherein said second spring means is removable from said support with said recording medium to move the recording medium back to said one position when the recording medium is removed from said support.

22. Recording and playback apparatus, comprising a movable recording medium, means for recording information onto and playing information back from the recording medium, a drive mechanism for driving the recording medium for recording and playback operations, a stopping member movable into engagement with a selected part of the drive mechanism for stopping the drive mechanism to suspend recording and playback operations, spring means for biasing said stopping member into engagement with said selected part of the drive mechanism, and manually actuable means for moving said stopping member temporarily out of engagement with said selected part upon operation of said manually actuable means to release the drive mechanism and permit recording and playback operations, said spring means returning the stopping member back into engagement with said selected part after cessation of an operation of said manually actuable means.

23. Recording and playback apparatus, comprising a movable recording medium, means for recording information onto and playing information back from the recording medium, a drive mechanism for driving the recording medium for recording and playback operations, a stopping member movable into engagement with a selected part of the drive mechanism for stopping the drive mechanism to suspend recording and playback operations, spring means for biasing said stopping member into engagement with said selected part of the drive mechanism and manually actuable means for moving said stopping member temporarily out of engagement with said selected part upon operation of said manually actuable means to release the drive mechanism and permit recording and playback operations, said spring means returning the stopping member back into engagement with said selected part after cessation of an operation of said manually actuable means, the drive mechanism including a drive spring, an operating member movable from an initial to an advanced position for tensioning the drive spring preparatory to a recording and preparatory to a playback operation, gear means connected to said recording medium and said operating lever for moving the recording medium from one position to another when said operating member is moved from said initial to said advanced position, and clutch means for suspending the stopping operation of said stopping member when said operating member is moved from said initial to said advanced position.

24. Apparatus as claimed in claim 23, including governor means for checking the operation of the drive mechanism and the movement of the recording medium during recording and playback operations, said governor including a step-up gear and said clutch means connecting said step-up gear to said gear means to suspend the regulating operation of said governor when said operating member is moved from said initial to said advanced position.

25. Recording and playback apparatus, comprising a recording medium movable from a first position to a second position, first spring means connected to the recording medium to be wound when the recording medium is moved from the first position to the second position and to move the recording medium subsequently back to the first position, a drive actuable from an initial to an advanced position and connected to the movable recording medium for driving the recording medium from one of said first and second positions to the other position when the drive is actuated from the initial to the advanced position, second spring means connected to the drive to be tensioned when the drive is actuated from the initial to the advanced position and to return the drive thereafter to the initial position, governor means connected to the drive and the recording medium for checking the action of the first and second spring means to control the speed at which the drive is returned to the initial position and the speed at which the recording medium is moved back to said other position, and recording and playback means for recording information onto, and selectively playing information back from, said recording medium when the recording medium is moved back to said other position.

References Cited by the Examiner

UNITED STATES PATENTS

| | | | |
|---|---|---|---|
| 2,068,130 | 7/1937 | Hickman et al. | 274—11 |
| 2,654,609 | 10/1953 | Shepherd | 274—11 |
| 3,056,606 | 10/1962 | Schueler et al. | 274—17 |
| 3,177,768 | 4/1965 | Hallamore | 88—28 |

NORTON ANSHER, *Primary Examiner.*

C. B. PRICE, *Assistant Examiner.*